United States Patent [19]

Gray et al.

[11] Patent Number: 4,722,471

[45] Date of Patent: Feb. 2, 1988

[54] SOLDER CONNECTOR DEVICE

[75] Inventors: Roger W. Gray, Swindon, England; Christian G. Roux, Mery, France; Peter A. Bostock, Atherton, Calif.

[73] Assignee: Raychem Pontoise S.A., France

[21] Appl. No.: 73,390

[22] Filed: Jul. 13, 1987

Related U.S. Application Data

[63] Continuation of Ser. No. 841,990, Mar. 20, 1986, abandoned, which is a continuation of Ser. No. 756,875, Jul. 18, 1985, abandoned.

[30] Foreign Application Priority Data

Jul. 18, 1984 [GB] United Kingdom ................. 8418369
Apr. 15, 1985 [GB] United Kingdom ................. 8509563

[51] Int. Cl.⁴ ..................... B23K 3/06; B23K 31/02; B23K 37/06
[52] U.S. Cl. ................................. 228/265; 228/179; 228/256; 228/56.3
[58] Field of Search ............... 228/56.3, 179, 265, 228/256; 29/447, 860, 872, 868–871, 873

[56] References Cited

U.S. PATENT DOCUMENTS

| | | | |
|---|---|---|---|
| 3,065,539 | 11/1962 | Hannegan | 228/227 |
| 3,243,211 | 3/1966 | Wetmore | 29/872 |
| 3,316,343 | 4/1967 | Sherlock | 228/56.3 |
| 3,525,799 | 8/1970 | Ellis | 228/56.3 |
| 3,678,174 | 7/1972 | Ganzhorn | 228/56.3 |
| 3,818,123 | 6/1974 | Maltz et al. | 228/56.3 |
| 4,505,421 | 3/1985 | Gen et al. | 228/56.3 |

FOREIGN PATENT DOCUMENTS

| | | | |
|---|---|---|---|
| 1470049 | of 0000 | United Kingdom | 29/872 |
| 2020922 | of 0000 | United Kingdom | 228/56.3 |
| 908751 | of 0000 | United Kingdom | 29/872 |

OTHER PUBLICATIONS

Raychem Devices Division Europe Coaxial Splice Kit B500.0157, Raychem Devices Division Europe TelPak Splice TSN75TA07/29, and TSN 75 S 07/29; TSN 75 RA 07/29; TSN 75 TA 12/44.

Primary Examiner—Nicholas P. Godici
Assistant Examiner—Samuel M. Heinrich
Attorney, Agent, or Firm—T. Gene Dillahunty; Herbert G. Burkard

[57] ABSTRACT

This invention relates to heat-shrinkable devices for forming solder connections between two bodies such as electrical conductors or pipes. The devices each comprise a hollow, heat-shrinkable sleeve having at least one aperture and containing first and second solder inserts. The solder inserts are located adjacent to each other and the second insert responds to heat applied to the device more slowly than the first insert. Usually the second insert has a higher melting point than the first insert. When the device is installed the first solder insert melts but is prevented from flowing out of the aperture in the device by the second insert. Also flow of the fused first solder insert onto the second solder insert causes the second insert to melt with less heat being applied to the device than would be needed if only the second, higher melting point solder insert were present in the device.

20 Claims, 10 Drawing Figures

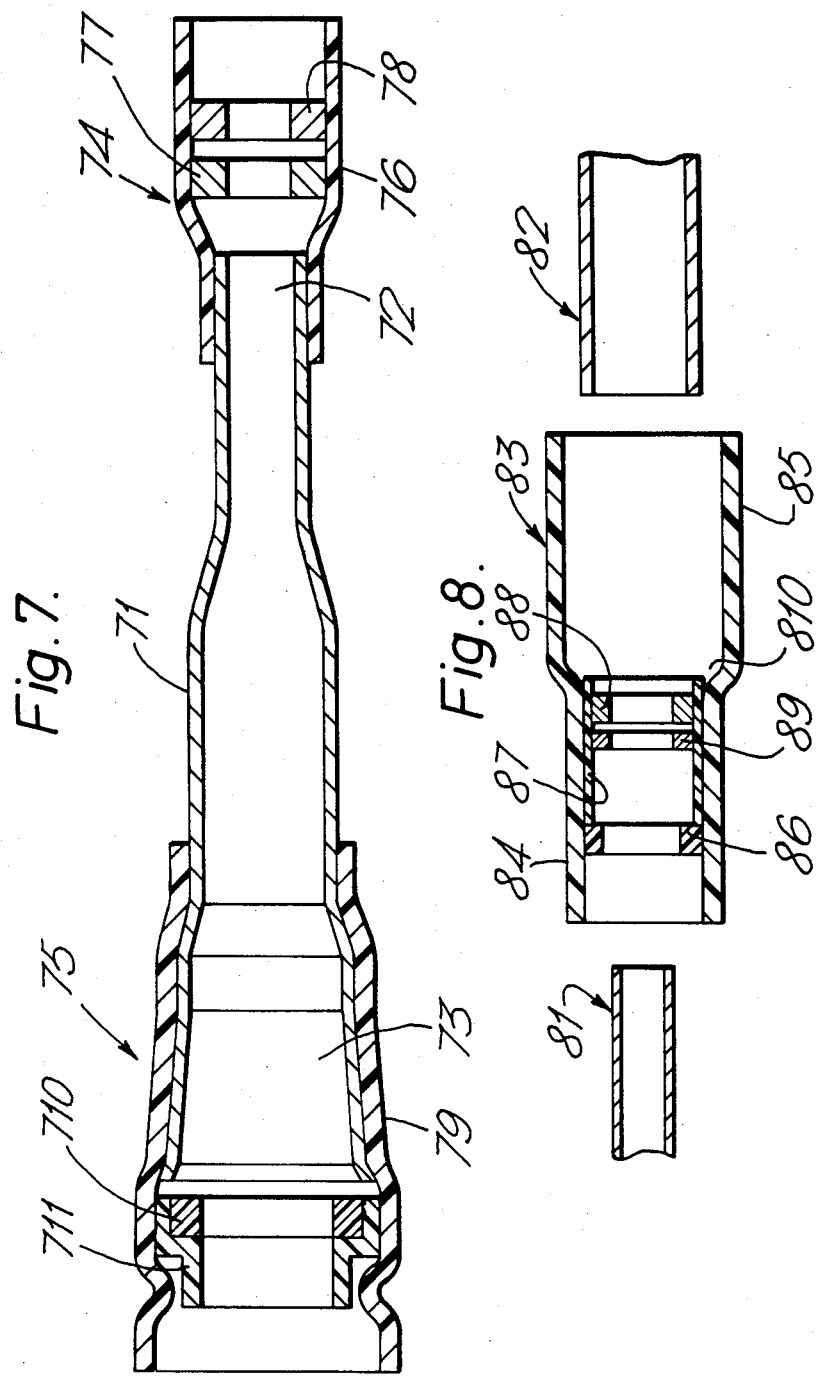

SOLDER CONNECTOR DEVICE

This application is a continuation of application Ser. No. 841,990 filed, Mar. 20, 1986, now abandoned, which is a continuation of application Ser. No. 756,875, filed July 18, 1985, now abandoned.

This invention relates to devices for forming solder connections, for example electrical connections, between electrical conductors or mechanical connections between pipes and other equipment. In particular the invention relates to such devices that are dimensionally heat-recoverable.

Heat-recoverable articles are articles the dimensional configuration of which may be made substantially to change when subjected to heat treatment.

Usually these articles recover, on heating, toward an original shape from which they have previously been deformed but the term "heat-recoverable," as used herein, also includes an articles which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable form in a separate stage.

In the production of heat-recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440,524, an elastomeric member such as an outer tubular member is held in a stretched state by a second member, such as an inner tubular member, which, upon heating weakens and thus allows the elastomeric member to recover.

Heat-recoverable articles have become widely used for forming solder connections between electrical conductors in view of the ease of forming the connection and the quality of the connection so formed. For such applications the article, usually in the form of a sleeve, contains a quantity of solder for forming the electrical connection and a pair of fusible inserts for sealing the conection. These articles are described for example in U.S. Pat. Specification Nos. 3,243,211, 4,282,396 and 4,283,596, and British Pat. No. 1,470,049 the disclosures of which are incorporated herein by reference, and are sold by Raychem Corporation, Menlo Park, California under the trade mark "SOLDER SLEEVE" amongst others.

Although such devices are satisfactory for many applications, in certain instances the quality of the connection formed may depend significantly on the skill of the installer, and, in particular, the devices may be sensitive to underheating or overheating or both. This may result in unreliable connections, or damage to the sleeve of the device or the insulation surrounding the conductors to be connected. In other fields of application, for example when mechanical joints are being formed, the existing devices may be unsuitable in view of poor or unreliable substrate penetration of the solder.

The present invention provides a device for forming a solder connection between a plurality of elongate bodies, which comprises a hollow, dimensionally heat-recoverable article having an aperture therein, the article containing a first solder insert for forming a solder connection between the bodies and containing a second solder insert, each insert being arranged to flow directly onto the bodies when the device is heated, the second insert being located adjacent to the first insert and responding to heat applied to the article more slowly than the first insert, so that, when the device is heated to form the connection, the second insert acts as a barrier to control the extent of flow of the fused solder insert along at least one of the bodies.

Preferably at least one of the bodies to be connected is elongate, and usually the device is used to connect two elongate bodies, for example wires or pipes.

The term "solder" as used herein includes both conventional metallic solder and solder adhesives in which a hot-melt adhesive, e.g. a polyamide hot-melt adhesive, or a thermosetting adhesive such as an epoxy adhesive, is filled with metal particles, e.g. with silver flake. In most cases, however, the solder inserts will be formed from conventional metallic solder.

The response to heat of the solder inserts is intended to mean the speed with which each solder insert melts. In the preferred embodiments of the invention the response of the solder inserts to heat applied to the device is determined by the material forming each insert. For example the insert and the barrier may both be formed from solder of identical composition, the first insert being provided with a pigment to increase its infrared absorption as compared with that of the second insert or "barrier". Alternatively the first and second solder inserts may be formed from different solder alloys so that the first insert melts at a lower temperature than that of the second insert barrier. In this case it is preferred for the temperature difference between the first and second insert points to be at least 10, more preferably at least 20 ad especially at least 40° C. but preferably not more than 120, more preferably not more than 90 and expecially not more than 70° C. The two inserts may be formed from eutectic compositions having different melting points, for example the first insert may be formed from a 63% Sn/37% Pb eutectic and the second from a 96% Sn/4% Ag eutectic, or the first insert may be formed from a eutectic composition, e.g. a 63% Sn/37% Pb composition while the second is formed from a non-eutectic composition, e.g. 50% Sn/50% Pb. In the latter case, although the second insert will begin to melt at the melting point of the solder insert, it will then go through a "pasty" phase as the temperature rises until it is fully molten, and, during part of the "pasty" phase, will act as a barrier to the fused first solder insert. Preferably, however, the second insert is formed from a eutectic composition in order to provide a prompt indication that sufficient heat has been applied to the device. In another form of device the two solder inserts may be formed from the same material but the second insert may be prevented from heating up as quickly as the first insert by appropriate design of the article, for example by locating the second insert in part of the article having a relatively large wall thickness in the case of devices intended to be heated by hot air, or, in the case of devices intended to be heated by infrared radiation, by locating a heatshield, e.g. a layer of metal foil, over the second insert, or the device may be arranged and installed so that the hot article, when recovering, comes into contact with the first solder insert before the second insert.

When the device is heated to form the connection, the second insert, or barrier, will remain substantially undeformable until after the first solder insert has melted. By "substantially undeformable" is meant that for at least part of the time during installation that the first solder insert is fused, the second insert will not be deformed by the pressure of the fused solder and will therefore prevent or suppress flow of the fused first solder insert in at least one direction along the bodies. The second insert may, however, be deformed by recovery of the article about the bodies before it has melted, and, in many cases, this will be desirable. During installation the article will usually recover about the bodies before the second insert has melted, and in most cases before the first solder insert has melted, so that the profile of the first and second inserts can be seen as raised portions on the outer surface of the article, the raised portions collapsing as soon as the inserts melt. Once the second insert melts or softens, determined by collapsing of the relevant part of the article, the heating step may be terminated and when cool, the solder joint is complete.

The second insert is preferably located within the article between the first insert and the aperture, or if more than one aperture, e.g. an open end, is present, between the first insert and at least one of the apertures. Where there is more than one aperture and second inserts are not placed either side of the first insert, it is preferred that the second insert is located between the first insert and the aperture towards which the fused solder of the first insert would flow in the absence of the second insert. The or each aperture in the article will usually be present in order to allow insertion of one of the bodies to be connected in the article. However, in some devices, for example the device described in British Patent Application No. 8409701, the disclosure of which is incorporated herein by reference, an aperture is present to act as a vent hole to allow escape of hot gases formed on heating the solder. In some devices according to the present invention, a second insert is provided on more than one side of the first solder insert, and preferably between the first insert and each aperture in the article. It has also been found that, even when the first insert is located between the second insert and an aperture in the device, the second insert may prevent the flow of the fused first solder insert towards the aperture to some extent. It is thought that this is because there is an affinity between the two solder inserts and, when fused, the first solder insert is attracted towards the second insert.

The presence of the scond insert controls the extent to which the molten first solder insert can flow along the bodies in at least one the directions. This control of the flow of the first solder insert has a number of advantages depending on the application. For example it will prevent fused solder from flowing or "squirting" out of the aperture if the device is overheated, and so prevent damage by the hot solder to the insulation surrounding the bodies, in the case of insulated wires for example and also, prevent the formation of an electrically conductive path between the interior and the exterior of the device which can occur with existing solder connectors. Also, the limitation of fused solder can enable the overall quantity of solder that is used to form the device to be reduced since the fused solder is constrained to remain in that position within the device in which the solder joint is to be formed. It will be appreciated that the reduction in the quantity of solder required in the connector also reduces the likelihood of solder flowing out through the aperture if the device is overheated. In other applications, for example in the formation of mechanical connections between pipes, the limitation in the flow of the fused first solder insert in one direction can cause the fused solder to flow in the opposite direction and therefore to penetrate the bodies adequately. Thus, for example, if the end of one pipe is inserted into the end of a larger pipe and the device is arranged about the pipe joint so that the solder insert is located about the smaller pipe, between the end of the larger pipe and the second insert, the provision of the second solder insert together with the recovery of the article forces the fused first solder insert into the joint formed by the ends of the pipes. In addition, in some instances, the melting point of the second solder insert provides a ready indication that the required temperature has been reached for the solder to have wetted the bodies and formed a good solder joint between them, and that further heating of the device should be discontinued in order to prevent overheating.

The device overcomes the problems that are connected with the use of polymer barrier inserts that have been proposed in the past. For example, because polymers usually have a relatively broad softening temperature range, e.g. about 50° C., the use of a high temperature polymer barrier may allow the device to be overheated to a considerable extent before softening of the barrier is detected, and thereby allow degradation of the barrier and/or the conductor insulation, often associated with a build up of pressure within the recovered device from volatile species in the insulation, barrier or recoverable article. If instead a polymer having a lower softening temperature range is used as a barrier it will begin to flow at too low a temperature and so must be located at some distance from the solder, in which case it will exert little control if any over the flow of the fused solder.

In most forms of device according to the invention the second solder insert will control the extent of flow of the fused first solder insert by delimiting the extent of flow of the fused insert in a direction toward the barrier. However, in some forms of device the second insert is present in order to control the extent of flow of the fused solder in a direction away from the second insert. For example in some cases such as described in British Patent Application No. 8409701 one end of the article is provided with a low softening temperature polymeric sealing ring which, when the device is overheated, may force the fused solder toward the other end of the article. In this device the second insert may, if desired, be located between the polymeric sealing ring and the first solder insert in order to prevent the fused sealing ring forcing the fused solder insert out of the opposite end of the article.

When the device according to the present invention is installed, enough heat is preferably applied to fuse the second solder insert in addition to the first solder insert. Thus the second insert may also and preferably does form part of the solder connection between the bodies.

In another aspect, the invention provides a device for forming a solder connection between a plurality of bodies, which comprises a hollow, dimensionally heat-recoverable article having an aperture therein, the article containing first and second solder inserts for forming a solder connection between the bodies, each insert being arranged to flow directly onto the bodies when the device is heated, the second insert being of a higher melting point than the first insert, the inserts being located adjacent to eachother, so that, when the device is heated, fused solder from the first insert will contact the second insert.

Surprisingly, it has been found that, when a high and a low melting point solder insert are located adjacent to each other in a device according to the invention and the device is heated, less heating is required to melt the second, high melting point insert than if both inserts comprised only the high melting point solder. Although the reason for this is not known with certainty, it is believed that it is because, when the first, lower melting point solder insert melts it contacts the second, higher melting point insert which enables heat to be transferred to the second insert more efficiently and thus reduces the amount of applied heat required to melt the higher melting point insert.

This has a number of advantages. For example, when a joint is formed with a relatively high melting point solder, the heat required to melt the solder may damage the heat-recoverable polymeric sleeve of the connection device or the wire insulation where wires are being connected. However, if a lower temperature solder is used in addition to the higher temperature solder according to the present invention, because the flow of the fused lower temperature solder onto the higher temperature solder facilitates the melting of the higher temperature solder and enables it to melt with less heat being applied to the device than if the lower temperature solder were not included in the device, likelihood of damage to the polymeric sleeve and the wire insulation when the device is installed is reduced.

The advantage of this quicker melting of the higher temperature solder is particularly useful where one purpose of the second, higher melting point solder insert is to act as a barrier to control the extent of flow of the fused first, lower temperature insert. It would be expected that the quantity of solder in the first insert required to form the connection would be the same whether or not a second solder insert were also present because the heat required to melt the second insert, and thereby cause it to form part of the solder connection, would be too great and would result for example in damage to wire insulation. However, it has been found that after the first solder insert melts, its flow being controlled by the solid second insert, the fused first solder insert contacts the second solder insert causing the second insert to melt with relatively little further heating, and therefore the second insert also forms part of the solder connection. Thus the second solder insert may replace part of the lower temperature solder.

Another advantage of the heat transfer mechanism from the lower to the higher temperature solder, is that less time is taken to install the device than if only a high temperature solder were used.

By melting first, the lower melting point solder of the first insert may pre-tin the conductors to be connected and improve the wettability of the conductor surfaces. Thus when the higher melting point solder of the secodn insert melts a more reliable connection may be formed.

The device according to either aspect of the invention may have any of a number of configurations provided that the fused solder can flow directly on to the bodies to be connected when the device is installed, that is to say the flow of the solder onto the bodies is substantially unhindered or unobstructed, for example by an object positioned radially in the device between, at least a major part of the solder inserts and the bodies to be connected. Any hindrance or obstruction of this direct flow would decrease or destroy the barrier effect of the second solder insert. Furthermore an object positioned between the solder inserts and the bodies particularly if it were in contact with one or both of the solder inserts, would adversely affect any heat transfer of the first solder insert to the second insert. The presence of a small object such as a wire or pin pre-installed in the device prior to its installation is, of course, within the scope of the invention. Examples of such devices include termination devices wherein a ground lead is located within the sleeve and in contact with at least one of the solder inserts, or a device for connecting a wire to a printed circuit board, which comprises a metallic pin located within the sleeve of the device and in contact with one or both of the solder inserts. In each case the wire or pin comprises one of the bodies to be connected by the device, and the presence of this wire or pin does not substantially hinder or obstruct the direct flow of the solder onto the bodies.

For example the device may be in the form of a simple open-ended sleeve, each end of which is intended to receive one of the bodies to be connected. The dimensions of the sleeve may be substantially constant or one end may be larger than the other in order to accommodate a relatively large body. This may for example be the case where two pipes are intended to be joined, one pipe being larger than the other in order to receive the other therein. Alternatively the heat-recoverable article may be in the form of a cap, for example for forming a stub joint between a number of electrical conductors all of which are inserted into one open-end of the device. In another form of device which provides a composite connector, the article may have a metal connection element, e.g. a short piece of tube in the case of a pipe connector or a piece of braid in the case of a coaxial cable connector. The first and second solder inserts are positioned in the article adjacent to one or both ends of the connection element so that the element does not hinder the direct flow of each fused solder insert on to the bodies to be connected when the device is heated. Yet another form of device may be a multiple connector in which an array of hollow articles has been formed by bonding together a pair of superimposed webs of polymeric material at spaced apart intervals and then crosslinked, for example as described in British Patent Specification No. 2,084,505A, the disclosure of which is incorporated herein by reference.

As stated above the first and second inserts are adjacent to eachother, and preferably are located side-by-side within the device. Preferably the inserts are spaced apart by no more than 1 mm and more preferably are in contact with each other before the device is heated.

The first solder insert may have any of a number of configurations and may be located concentrically or eccentrically within the article. Accordingly the second solder insert may have any of a number of configurations depending on the configuration of the first insert. Preferably, however, the second insert is arranged to extend around the body to be inserted, if the configuration of the body allows this, in order to prevent the fused first solder insert finding a path around the second insert, and so the second insert is preferably in the form of a ring arranged substantially coaxially within the article. In the majority of forms of device the two solder inserts will be in the form of rings located coaxially within the article and will advantageously have substantially identical external and/or internal diameters before recovery of the article.

Although this is not necessary, it may be desirable to provide the device with a temperature indicator, for example a thermochromic material, in order to indicate when sufficient heat has been applied. Preferably this indicator is contained in a flux used with one or both of the solder inserts, usually the first insert. Examples of thermochromic indicators are given in British Patent Specification No. 2,109,418A, the disclosure of which is incorporated herein by reference.

If desired one or more conductors may be preinstalled in the article e.g. as described in U.S. Pat. No. 4060,887 or UK Patent Specification No. 1,599,520, the disclosure of which are incorporated herein by reference, so that, in some cases, only a single conductor need be inserted in the device when the connection is made.

Optionally, the device may be provided internally with a sealing material such as an adhesive or a sealant, which may cover the whole of the inner surface, or may be present on part of the inner surface such as rings located, for example adjacent to the ends of device. The sealing material may comprise, for example a fluorinated polymer such as polyvinylidene fluoride, an olefin homo-or copolymer such as polyethylene, or ethylene vinylacetate copolymer, a polyamide, or a blend thereof.

in order to form a solder connection between a plurality of bodies by means of the device according to the invention, the bodies are introduced into the appropriate position within the device and the device is heated to melt the first solder insert, and to recover the article about the bodies, the heating being continued to cause the second solder insert at least to soften and preferably to melt.

Suitable materials for the heat-recoverable article of the present invention include alkene homo- or copolymers, for example polyvinylidene fluoride.

Several devices in accordance with the present invention will now be described, by way of example, with reference to the accompanying drawings, in which:

FIGS. 5 to 8 show devices for connecting pipes together;

Figure 1:
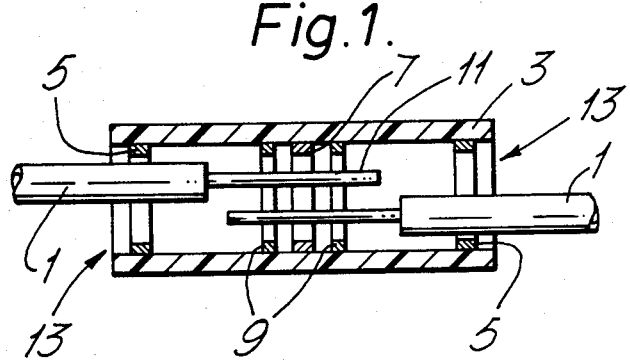
FIG. 1 is a sectional elevation along the axis of one form of device for connecting electrical conductors, the device having a pair of insulated conductors inserted therein.

For the sake of clarity the solder inserts have been shown in the drawings as being spaced apart, although it is preferred that the inserts be in contact with each other in use.

FIG. 1 shows a device for forming a solder lap connection between a pair of insulated electrical conductors 1, which comprises a hollow heat-shrinkable polyvinylidine fluoride ($PVF_2$) tube 3 having a ring 5 of non-crosslinked, low density polyethylene at each end. Towards the centre, the tube is provided with a first solder insert 7 formed from a 63% Sn/37% Pb eutectic, which melts at 183° C. and with a second solder insert 9 on each side of the insert, the barriers being formed from a 96% Sn/4% Ag eutectic which melts at 223° C.

In order to form a lap connection between a pair of insulated electrical conductors 1, the end 11 of each conductor is stripped of insulation, and the conductors are inserted into opposite ends 13 of the tube until they overlap in the centre. The device is then heated, for example by means of an infrared lamp to cuase it to recover and to form a solder connection. During the heating step, the polyethylene rings 5 soften and the tube 3 recovers about the overlapped conductors so that the open ends 13 are sealed and the solder rings 7,9 are forced onto the stripped ends 11 of the conductor. Subsequently during the heating step, the first solder insert 7 melts and is forced to flow along the conductors, the flow being limited by the non-deformable second solder inserts 9 in contact with the conductors. After further heating, and with the transfer of heat from the fused first solder insert to the second insert, the solder inserts 9 soften and are compressed by the tube 3 as it recovers, so that the installed device has a substantially smooth profile. Since the second solder inserts are formed from a eutectic with a higher melting point than that of the first solder insert, they provide a reliable indication of when sufficient heat has been supplied to install the device. After the device and the conductors have been allowed to cool down, the solder connection is complete.

Figure 2:
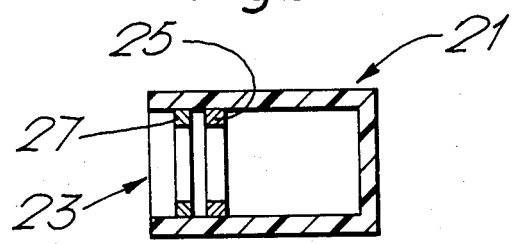
FIG. 2 is a sectional elevation of an end cap which may be used to form a stub connection.

FIG. 2 shows a device which has the form of a cap, which may be used to form a solder stub connection. The device comprises a hollow heat-shrinkable $PVF_2$ tube 21 which is closed at one end. Towards its open end 23, the tube contains a first solder insert 25 and a second solder insert 27 between the first insert and the open end. The tube may also be provided at its open end with a lining of polyethylene or of another hot-melt adhesive to seal the material of the tube to the insulation of the conductors which are to be connected.

In use, the stripped ends of the conductors are inserted into the tube through the end 23 and the device is heated to cause the tube 21 to recover and to melt at least the solder insert 25. As the tube recovers, flow of the molten insert towards the open end 23 is surppressed by the non-deformable second solder insert 27. On continued heating, the second insert melts and flows and tube 21 recovers further to give a substantially smooth profile to the installed device.

Figure 3:
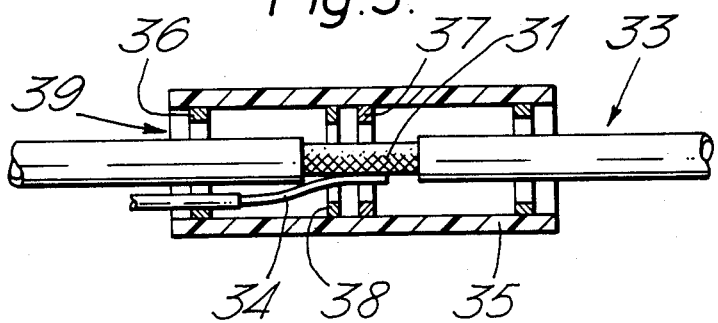
FIG. 3 illustrates the use of a device to connect an electrical conductor to the outer conductor of a coaxial cable.

The device shown in FIG. 3 may be used to connect to the braided outer conductor 31 of a coaxial cable 33 to a subsidiary conductor 34 particularly one that is covered with heat-sensitive foam skin insulation. The device comprises a heat-shrinkable $PVF_2$ tube 35, which contains polyethylene rings 36 towards its ends, and a first solder insert 37 and a second solder insert 38 towards the centre. In use, the device is positioned over a portion of the coaxial cable 33 from which the outer insulation has been removed to expose the outer conductor 31. The subsidiary conductor 34 is inserted into the end 39 of the tube which is nearer to the second insert than to the first insert. When the device is heated, the second insert 38 suppresses flow of the molten solder insert 37 along the hot subsidiary conductor 34 and towards the heat-sensitive foam insulation and the change of damage to the insulation, which may affect signal integrity and/or give rise to noxious fumes, is reduced.

Figure 4:
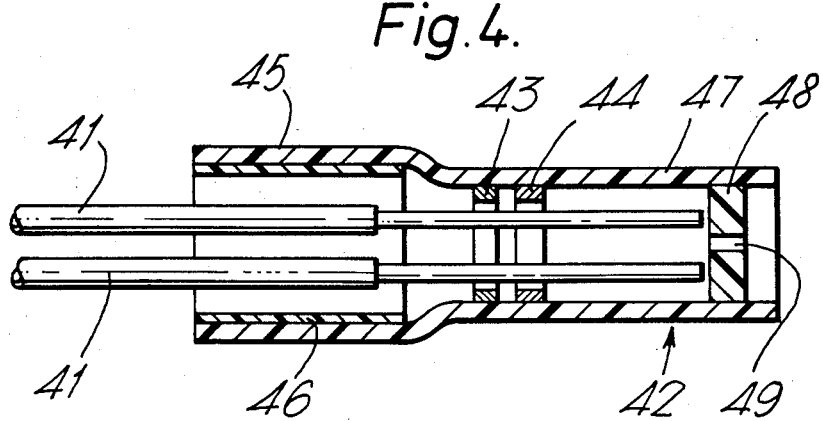
FIG. 4 is a sectional elevation another device for forming a stub connection.

FIG. 4 shows a device, which is similar to that disclosed and claimed in our co-pending UK Patent Application No. 8409701, for forming a stub connection between a pair of electrical conductors 41. The device comprises a heat-shrinkable polyethylene tube 42 which contains a fluxed first solder insert 43 and a second solder insert 44 located approximately centrally therein. The tube 42 has a first end portion 45 which is provided with a lining 46 of a sealing material, such as an ethylene vinyl acetate copolymer. The tube 42 also has a second end portion 47, which is blocked with a plug 48 of another sealing material, preferably polyethylene or $PVF_2$ or a blend of $PVF_2$ with a fluorocarbon elastomer. The plug 48 has a central aperture 49.

In order to form a connection between a pair of conductors 41 the device is heated to bring about the following events:

the lining 46 softens and the first end portion 45 recovers so that the end portion 45 is sealed;

the solder insert 43 melts and is forced onto the bared ends of the conductors 41 by recovery of the central portion of the tube. The solder insert is forced also towards the second end portion 47 by the recovery forces exerted by the first end portion. Flow of the molten insert toward the second end portion is controlled by the non-deformable solder insert 44;

the flux in the solder insert is displaced by the solder as the central portion recovers, and gaseous decomposition products of the flux are allowed to exit the device via the aperture 49; and, on continued heating, the solder barrier softens and is deformed. The plug 48 softens and is deformed under the recovery force of the second end portion 47 to seal the second end portion of the tube.

Figure 5:
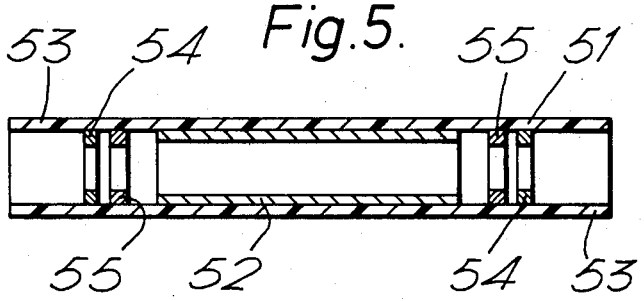
Figure 6:
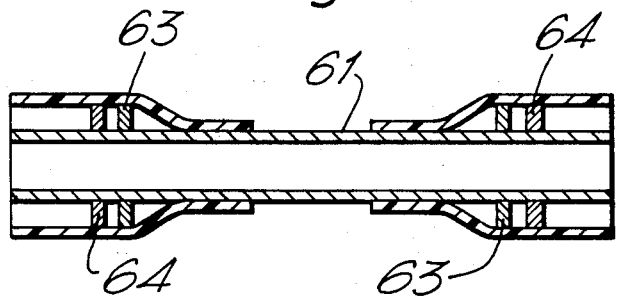

FIGS. 5 to 7 show devices for connecting pipes together. The device in FIG. 5 comprises a heat-shrinkable $PVF_2$ sleeve 51 which is provided with a lining of a polyamide hot-melt adhesive. The sleeve 51 is positioned over a rigid copper tube 52 which is shorter than the sleeve, so that the ends of the sleeve extend beyond the ends of the tube 52 in the form of a pair of skirts 53. A first solder insert 55 is located within each skirt, together with a solder insert 54, the first insert 55 being between each second insert 54 and a respective end of the tube 52. In use, the pipes to be connected are simply pushed 10 into each end of the tube 52 and the device is heated to recover the skirts 53 onto the pipes. Heating of the device also causes the solder insert 55 to melt and flow, the solder insert 54 directing the fused solder insert between the pipes. When the tube 52 varies in diameter between its end regions, the device may be used to provide a transition between pipes of differing diameter.

A further form of device shown in FIG. 6 comprises a rigid copper tube 61 which is provided at each end with a partially shrunk piece of $PVF_2$ tubing which is lined with a hot-melt adhesive and which contains a first solder insert 64 and a second solder insert 63. This device may be used to connect pipes of slightly larger diameter than that of the tube 61 or which have been swaged open at their ends to a slightly larger diameter. The pipes to be connected are pushed over the ends of the tube 61 until their ends abut the solder inserts 64 and 63 and the skirts are recovered about the pipe ends as described above.

In some instances, when two bodies, for example pipes, are to be connected together by a connection element such as a metal tube, as shown in FIG. 6, it may be preferred for one of the bodies to be connected to the element by a solder connection using a device according to the present invention, and the other body to be connected to the element by means of a thermosetting adhesive, for example as described in UK Patent Publication No. 2,149,468, the disclosure of which is incorporated herein by reference. One instance is in the connection of pipes of considerably differing diameters, where a tapered connection element is used, an example being the connection of a small diameter capillary tube to a larger diameter pipe that connects to a dryer assembly in refridgeration appliances. When joining pipes of small outer diameters, for example where one of the pipes has an outer diameter of 2.0 mm or less, it is advantageous to use a dimensionally recoverable article containing a solder insert. One reason for this is that a theremosetting adhesive is too viscous, when heated, to flow between the small pipes to form a connection, whereas solder is able to flow and form a reliable connection. Therefore, it is preferred that the larger end of the tapered connection element is provided with a recoverable skirt containing a thermosetting adhesive bonding insert, and the smaller end of the tube is provided with a recoverable skirt containing a solder insert.

FIG. 7 illustrates such a device. The device comprises a tapered copper tube 71 having a smaller, non-flared end-region 72 and a larger, flared end-region 73. This flared end-region is frusto-conical in shape. Each end-region is provided with dimensionally recoverable skirts 74 and 75. The skirt 74, positioned at the smaller end-region 72, comprises a dimensionally heat-recoverable cross-linked polyvinylidene fluoride tube 76 that has partially recovered on to the rigid tube 71, and has an inner lining of polyamide hot-melt adhesive (not shown). The recoverable tube 76 contains a first solder insert 77 formed from a 63% Sn/37% Pb eutectic and a second solder barrier insert 78 formed from a 96% Sn/4% Ag eutectic. The tube 76 may also contain an additional polymeric sealing ring positioned between the barrier insert 78 and the end of the recoverable tube 76 remote from the rigid tube 71. The skirt 75, positioned at the larger end-region 73, comprises a dimensionally heat-recoverable, cross-linked, polyvinylidene fluoride tube 79 that has been partially recovered onto the rigid tube 71, and has an inner lining of polyamide hot-melt adhesive (not shown). The recoverable tube 79 contains an epoxy adhesive bonding insert 710 which melts at approximately 80° C. and has an initial curing point of approximately 105° C., and a nylon 12 barrier insert 711 which melts at approximately 177° C. The bonding insert 710 forms an integral part of the barrier insert 711. Both recoverable tubes 76 and 79 may be provided with thermochromic indicator, usually applied as a stripe on the outer surface of the tubes.

In use, the pipes to be connected are inserted into the skirts 74 and 75. Heat is then applied to the device, usually by a hot air gun. Both skirts may be heated simultaneously or they may be heated individually in which case it is preferred that skirt 75 containing the adhesive insert 710 is heated before skirt 74. The heat causes the tubes 76 and 79 to recover and the solder insert 77 and adhesive insert 710 to melt and flow between the rigid tube 71 and respective pipe. At this stage the barrier inserts 78 and 711 remain solid and force the fused solder and adhesive towards the respective connection to form a permanent bond between the rigid tube and the pipes, thus connecting the two pipes. Further heating causes the barrier inserts 78 and 711 to melt and flow. The tubes 76 and 79 recover further over the melted barrier inserts and thus the installer knows that sufficient heat has been supplied to the device.

FIG. 8 shows another deivce that may be used to connect tubes, for example copper tubes, with differing diameters, such as a capillary tube 81 and a small bore tube 82 having an external diameter of 3 mm. The device comprises a hollow heat-shrinkable sleeve 82 of $PVF_2$ or Nylon 11 or 12, the sleeve having a first portion 84 and a second portion 85, and being lined with a polyamide hot-melt adhesive. The first portion is of smaller diameter than the second portion. Towards the open end of the first portion 84, the sleeve 83 contains a polyethylene barrier ring 86, and a lining sleeve 87 of $PVF_2$ in abutting contact with the ring 86. The zone of the first portion which is lined by the sleeve 87 contains a first solder insert 88 and a second solder insert 89.

The device is installed by inserting the end of the tube 82 into the second portion 85 of the sleeve so that the tube abuts the shoulders 810 of the sleeve. The capillary tube 81 is inserted through the first portion 84 of the sleeve, beyond the shoulders 810 and into the end of the tube 82. The device is heated to recover the sleeve 83 and to melt its hot-melt adhesive lining so that the sleeve is sealed to the tubes 81, 82. The barrier ring 86 and the lining sleeve 87 serve to prevent the hot-melt adhesive from flowing into zone occupied by the solder inserts. The applied heat also causes the solder insert 89 and the lining sleeve to soften, and the solder insert 88 to melt and to flow, the fused solder being prevented by the solder insert 89 from flowing away from the connection along the smaller, and therefore hotter, tube 81, and instead is directed into the space between the tubes. Further heating causes the solder insert 89 to melt so that it can be deformed by the sleeve as it recovers and form part of the solder connection. After the device and the tubes have cooled down, the connection is complete.

Figure 9:
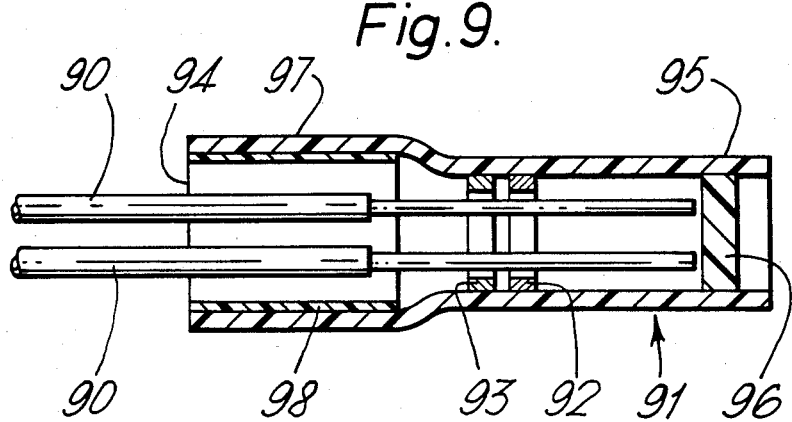
FIG. 9 is a sectional elevation of a further device for forming a stub connection.

FIG. 9 shows another pair for forming a stub connection between a pair of electrical cnductors 90. The device comprises a heat-shrinkable polyvinylidene fluoride tube 91 which contains a fluxed first solder insert 92 and a second solder insert 93, the insert being located approximately centrally within the tube 91 with the second insert 93 being between the first insert 92 and the aperture 94. The sleeve 91 has a first end portion 95 blocked by a solid plug 96 made from a material such as nylon, and second end portion 97 containing the aperture 94, the second end portion 97 being provided with a lining 98 of sealing material having a relatively high melting point.

In order to form a connection between the conductors 90 the device is heated causing the first solder insert 92 to melt, and recovery of the central portion of the sleeve forces the fused solder towards the bared ends of the conductors 90. The second solder insert 93 prevents the fused solder from the first insert from flowing out of the aperture 94. Further heating causes the second solder insert to melt and be deformed by the recovering sleeve. Any gases evolved during the melting of the solder inserts are allowed to exit via the aperture 94. Finally, further heating causes the lining 98 to soften and it is deformed under the recovery force of the second end portion 97 to seal the second end portion of the sleeve.

Figure 10:
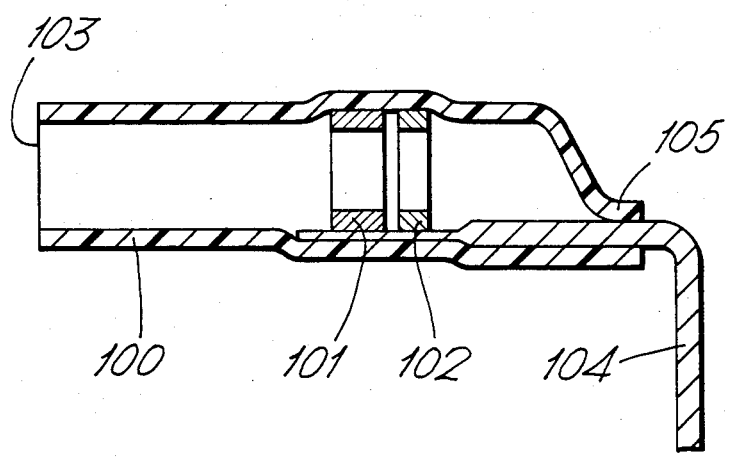
FIG. 10 is a sectional elevation of a device for forming a connection between an electrical conductor and a printed circuit board.

FIG. 10 shows the use of a device according to the invention for connecting an electrical conductor to a circuit board. The device comprises a heat-shrinkable polyvinylidene fluoride tube 100 containing a first solder insert 101 comprising, for example, 96% Sn/4% Ag (melting point 223° C.) and a second solder insert 102 having a higher melting point than the first insert, for example 5% Sn/1.5% Ag/93.5% Pb (melting point 296°–301° C.), the inserts being located approximately centrally within the tube 100 with the second insert 102 between the first insert 101 and the aperture 103. One end of a metal pin 104, comprising, for example, silver-coated phosphor bronze, bent at right-angles, is positioned in the tube remote from the aperture 103, and is in contact with the solder inserts 101 and 102. The end portion 105 of the tube is recovered to hold the pin 104 securely.

In use the stripped end of a conductor is inserted into the device via the aperture 103 and the device is heated to cause the tube 100 to recover and the first solder insert 101 to melt and flow between the conductor and the pin 104. The second solder insert 102 prevents the fused first insert flowing along the hot pin 104 towards the end portion 105 of the tube. A small amount of further heating together with flow of the fused first solder insert onto the second solder insert causes the second solder insert 102 to melt and form part of the solder connection.

The following examples illustrate the invention, and compare various devices containing first and second solder inserts according to the invention with similar devices containing only one type of solder insert.

EXAMPLE 1

The following experiments were carried out:
(a) A device as shown in FIG. 9, with the exception that the first and second solder inserts 92 and 93 were replaced with one solder insert comprising 58 mg of 63% Sn/37% Pb (melting point 183° C.), was used to connect two 0.4 mm diameter solid copper conductors. The device was installed by infra-red heating. The experiment was repeated a number of times and it was found that in 50% of the installed devices the solder had flowed out of the device via the aperture 94 remote from plug 96.

(b) A device as shown in FIG. 9 containing a first solder insert 92 comprising 39 mg 63% Sn/37% Pb and a second, higher melting point solder insert 93 comprising 19 mg 96% Sn/4% Ag (melting point 223° C.), the first insert being located between the second insert and the plug 96, was used to connect two 0.4 mm diameter solid copper conductors. The device was installed by infra-red heating. The experiment was repeated a number of times and it was found that no solder had flowed out of the device in any of the installed devices.

(c) A device as shown in FIG. 9 was used to connect two 0.4 mm diameter solid copper conductors. The device was the same as that described in experiment 1(b) above with the exception that the location of the first and second solder inserts 92 and 93 was reversed such that the second, higher melting point 96% Sn/4% Ag solder insert was located between the first, lower melting point 63% Sn/37% Pb solder insert and the plug 96. The device was installed by infra-red heating. The experiment was repeated a number of times and it was found that in 25% of the installed devices the solder had flowed out of the device via the aperture 94 remote from the plug 96.

Comparison of experiment 1(a) with 1(b) shows that flowing of the solder out of the device occurs when only one type of solder insert is used, but that this "squirting" is prevented when two types of solder insert are used with the higher melting point solder being located between the lower melting point solder and the aperture in the device through which the fused solder would flow. Experiment 1(c) shows that even when the solder inserts are not located so that the higher melting point solder acts as a physical barrier to prevent squirting of the lower melting point solder, squirting occurs only half as frequently as when one type of solder insert is used, due to the affinity between the two solder inserts.

EXAMPLE 2

The following experiments were carried out:

(a) A device as shown in FIG. 4, with the exception that the first and second solder inserts 43 and 44 were replaced with one solder insert comprising 58 mg 63% Sn/37% Pb, was used to connect two 0.4 mm diameter solid copper conductors. The device was installed by infra-red heating. The experiment was repeated a number of times and it was found that in 45% of the installed devices squirting of the solder had occurred via the aperture 49 in the plug 48.

(b) A device as shown in FIG. 4 containing a first solder insert 43 comprising 39 mg 63% Sn/37% Pb and a second solder insert comprising 19 mg 96% Sn/4% Ag, the second insert being located between the first insert and the plug 48, was used to connect two 0.4 mm diameter solid copper conductors. The device was installed using infra-red heating. The experiment was reepeated a number of times and it was found that no squirting had occurred in any of the installed devices.

These experiments show again that squirting of the fused solder is very likely to occur when only one type of solder insert is used, but this is prevented by the use of two solder inserts of different melting points with the higher melting point solder being located between the lower melting point solder and the aperture through which the lower melting point solder would flow or squirt.

EXAMPLE 3

The following experiments were carried out:

(a) An 18 AWG insulated wire was connected to a pre-installed pin for connection to a printed circuit board. A device as shown in FIG. 10 was used with the exception that the first and second solder inserts 101 and 102 were replaced by one solder insert comprising 16 mg 5% Sn/1.5% Ag/93.5% Pb (melting point 296°–301° C.). After heating the device, using an infra-red heating tool, for 46 seconds the polyvinylidene fluoride tube 100 began to blacken but the solder remained solid. After heating for a further 50 seconds the solder began to melt, by which time the polyvinylidene fluoride tube was severely damaged.

(b) An 18 AWG insulated wire was connected to a pre-installed pin for connection to a printed circuit board. A device as shown in FIG. 10 was used containing a first solder insert 101 comprising 8 mg 63% Sn/37% Pb (melting point 183° C.) and a second solder insert 102 comprising 16 mg 5% Sn/1.5% Ag/93.5% Pb. The device was heated using an infra-red heating tool. Both solder inserts had melted after 40 seconds of heating and no damage occurred to the polyvinylidene fluoride tube.

(c) An 18 AWG insulated wire was connected to a pre-installed pin for connecting to a printed circuit board. A device as shown in FIG. 10 was used containing a first solder insert 101 comprising 8 mg 63% Sn/37% Pb (melting point 183° C.) and a second solder insert 102 comprising 12 mg 5% Sn/1.5% Ag/93.5% Pb. The device was heated using an infra-red heating tool. Both solder inserts had melted after 24 seconds of heating and no damage occurred to the polyvinylidene fluoride tube.

These experiments illustrate that when a lower melting point solder is located adjacent to a higher melting point solder the time taken to melt the higher melting point solder is less than when only the higher melting point solder is used in the device. The experiments also show that the reduction in heating time occurs even when the total mass of lower and higher melting point solders is greater than that of the single higher melting point solder.

EXAMPLE 4

The following experiments were carried out:

(a) A 26 AWG insulated wire was connected to a pre-installed pin for connecting to a printed circuit board. A device as shown in FIG. 10 was used with the exception that the first and second solder inserts 101 and 102 were replaced by one solder insert comprising 16 mg 5% Sn/1.5% Ag/93.5% Pb. The device was installed using infra-red heating and 8–9 seconds of heating was required. It was found that some of the solder had flowed away from the joint and along the pin 104.

(b) A 26 AWG insulated wire was connected to a pre-installed pin for connecting to a printed circuit board. A device as shown in FIG. 10 was used containing a first solder insert 101 comprising 12 mg 96% Sn/4% Ag and a second solder insert 102 comprising 16 mg 5% Sn/1.5% Ag/93.5% Pb. The device was installed using infra-red heating and 4 seconds of heating was required. It was found that no solder had flowed away from the joint along the pin 104.

The experiments illustrate both the barrier effect of the second, higher melting point solder insert and the quicker melting time of the second insert caused by flow of the fused first, lower melting point solder insert onto the second insert.

EXAMPLE 5

The following experiments were carried out:

(a) A ground lead was connected to the outer conductor of a coaxial cable using a device as shown in FIG. 3 with the exception that the two solder inserts 37 and 38 were replaced with one solder insert comprising 61 mg of 63% Sn/37% Pb. The device was installed and, after being left to cool, the peel strength was tested by slitting open the sleeve and pulling back the ground lead 34. The experiment was repeated a number of times. It was found that the average heating time taken to install the device was 14±3 seconds and the average peel strength was 15±11 Newtons.

(b) A ground lead was connected to the outer conductor of a coaxial cable using a device as shown in FIG. 3 containing a first solder insert 37 comprising 39 mg 63% Sn/37% Pb and a second solder insert comprising 19 mg 96% Sn/4% Ag. The device was installed and, after being left to, the cool peel strength was tested by slitting open the sleeve and pulling back the ground lead 34. The experiment was repeated a number of times. It was found that the average time taken to install the device was 13±2 seconds and the average peel strength was 21±3.6 Newtons.

These experiments show that, for a given total mass of solder, a more consistent connection is formed with a higher average strength when two solder inserts of different melting points are used than when only the one solder insert is used.

We claim:

1. A device for forming a solder connection between a plurality of bodies to be inserted in the device, which comprises a hollow, dimensionally heat-recoverable article having an aperture therein, the article containing therein a first solder insert for forming a solder connection between the bodies and containing therein a second solder insert, each insert being arranged to flow directly and unrestrictedly onto the bodies when the device is heated, the second insert being located adjacent to the first insert and responding to heat applied to the article more slowly than the first solder insert, so that, when the device is heated to form the connection, the second insert acts as a barrier to control the extent of flow of the fused solder insert along the or at least one of the bodies.

2. A device as claimed in claim 1, wherein the second solder insert has a higher melting point than that of the first solder insert.

3. A device as claimed in claim 1, wherein the second solder insert has a lower infrared absorption than that of the first solder insert.

4. A device as claimed in claim 1, wherein the melting point of the second solder insert is at least 20° C. higher than that of the first solder insert.

5. A device as claimed in claim 1, wherein the melting point of the second solder insert is at least 40° C. higher than that of the first solder insert.

6. A device as claimed in claim 1, wherein the article contains a second solder insert on each side of the first solder insert.

7. A device as claimed in claim 1, wherein the first and second solder inserts are in the form of rings arranged coaxially within the article.

8. A device as claimed in claim 1, wherein the first and second solder inserts are in contact with each other before the article is heated.

9. A device as claimed in claim 1, which further includes a metal tube, the first and second solder inserts being located adjacent to at least one end of the tube, at least the first solder insert being arranged to form a connection between the tube and a body or bodies inserted into the device.

10. A device as claimed in claim 9, wherein the first and second solder inserts are located adjacent to one end of the tube, at least the first insert being arranged to form a connection between the tube and a body, and further including a thermosetting adhesive element to form a connection between the tube and another body.

11. A device as claimed in claim 1, which has two apertures therein, one aperture being larger than the other aperture, and in which the second solder insert is located between the first solder insert and the larger aperture.

12. A device as claimed in claim 1, which has been recovered onto an electrical conductor or other elongate body.

13. A method of forming a solder connection between a plurality of bodies, which comprises introducing the bodies into a device comprising a hollow, dimensionally heat-recoverable article having an aperture therein, the article containing a first solder insert therein for forming a solder connection between the bodies and containing a second solder insert therein, each insert being arranged to flow directly and unrestrictedly onto the bodies when the device is heated, the second insert being located adjacent to the first insert and responding to heat applied to the article more slowly than the firt solder insert, heating the device to melt the first solder insert and to cause the article to recover so as to urge the fused solder insert to flow, the extent of flow being controlled by the second solder insert; and continuing to heat the device further to cause the second solder insert to at least soften.

14. A method of connecting a plurality of hollow tubular bodies which comprises inserting the end of one body within the end of a second body, positioning about the bodies a device comprising a hollow, dimensionally heat-recoverable article having an aperture therein, the article containing a first solder insert therein for forming a solder connection between the bodies and containing a second solder insert therein, each insert being arranged to flow directly and unrestrictedly onto the bodies when the device is heated, the second insert being located adjacent to the first insert and responding to heat applied to the article more slowly than the first solder insert, wherein the first solder insert is axially located at or in the region of the end of the second body and between the second solder insert and the second body; heating the device to melt the first solder insert and to cause the article to recover so as to urge the fused first solder insert to flow, the second solder insert directing the fused first solder insert to flow between the ends of the bodies; and heating the device further to cause the second solder insert to at least soften.

15. A device for forming a solder connection between a plurality of bodies to be inserted in the device, which comprises a hollow, dimensionally heat-recoverable article having an aperture therein, the article containing first and second solder inserts therein for forming a solder connection between the bodies, each insert being arranged to flow directly and unrestrictedly onto the bodies when the device is heated, the second insert being of a higher melting point than the first insert, the inserts being located adjacent to each other, so that, when the device is heated, fused solder from the first insert contacts the second insert.

16. A device as claimed in claim 15, wherein the melting point of the second solder insert is at least 20° C. higher than that of the first solder insert.

17. A device as claimed in claim 15, wherein the melting point of the second solder insert is at least 40° C. higher than that of the first solder insert.

18. A device as claimed in claim 15, wherein the first and second solder inserts are in the form of rings arranged coaxially within the article.

19. A device as claimed in claim 15, wherein the first and second solder inserts are in contact with each other before the article is heated.

20. A method of connecting a plurality of bodies, which comprises introducing the bodies into a device comprising a hollow, dimensionally heat-recoverable article having an aperture therein, the article containing first and second solder inserts therein for forming a solder connection between the bodies, each insert being arranged to flow directly and unrestrictedly onto the bodies when the device is heated, the second insert being of a higher melting point than the first insert, the inserts being located adjacent to each other, heating the device to melt the first solder insert and cause the first solder insert to flow and contact the second solder insert, further heating to melt the second solder insert, the heating causing the article to recover so as to urge the fused solder inserts to flow directly onto the bodies and form a solder connection between the bodies.

* * * * *